United States Patent [19]
Pawar et al.

[11] Patent Number: 5,232,783
[45] Date of Patent: Aug. 3, 1993

[54] ABRASION RESISTANT COATINGS FOR GLASS ARTICLES

[75] Inventors: Prakash K. Pawar, Clifton Park; Frank J. Traver, Troy; Peter Miranda, Schenectady, all of N.Y.

[73] Assignee: General Electric Company, Waterford, N.Y.

[21] Appl. No.: 757,149

[22] Filed: Sep. 10, 1991

[51] Int. Cl.$^5$ .............................................. B32B 9/00
[52] U.S. Cl. ..................................... 428/429; 528/17; 528/41; 524/731; 524/773; 524/793; 524/863
[58] Field of Search .................. 528/10, 18, 17, 41; 524/773, 731, 793, 863; 428/429

[56] References Cited

U.S. PATENT DOCUMENTS

| | | | |
|---|---|---|---|
| 3,839,246 | 10/1974 | Hamilton et al. | 524/863 |
| 4,273,834 | 6/1981 | Yokokura et al. | 428/429 |
| 4,467,068 | 8/1984 | Maruyama et al. | 524/731 |
| 4,656,221 | 4/1987 | Kurita et al. | 524/731 |
| 4,871,616 | 10/1989 | Kimura et al. | 428/407 |
| 4,985,286 | 1/1991 | Kurita et al. | 428/34.7 |
| 5,095,086 | 3/1992 | Pawar et al. | 528/17 |

FOREIGN PATENT DOCUMENTS 63-117932  5/1988  Japan.

*Primary Examiner*—Melvyn I. Marquis
*Assistant Examiner*—Karen A. Dean

[57] ABSTRACT

A coating composition having improved abrasion resistance is provided, which comprises (A) a composition comprising (1) an organooxy-chainstopped organopolysilsesquioxane, (2) a tetraorganotitanate, (3) (a) a siloxane-functionalized ester having the general formula $(R^3O)_{3-2n}SiO_nR^4OC(O)R^5C(O)OR^6$, wherein n is equal to 0, ½, or 1, each $R^3$ is independently a saturated or unsaturated monovalent hydrocarbon radical containing from 1 to about 20 carbon atoms, $R^4$ is a divalent hydrocarbon radical containing from 1 to about 20 carbon atoms, $R^5$ is a divalent conjugated olefinic radical having from 2 to 4 carbon atoms, and $R^6$ is $R^3$ or $R^4SiO_n(OR^3)_{3-2n}$; or (b) a cyanoorganotriorganooxysilane: and (4) an organic carboxylic acid ester; and (B) from 0% to about 85% of a volatile diluent. Also provided is a coating composition having improved abrasion resistance wherein part (A) is a copolymer of the organopolysilsesquioxane (A)(1) above and the ester (A)(3).

18 Claims, 3 Drawing Sheets

ABRASION RESISTANT COATINGS FOR GLASS ARTICLES

BACKGROUND OF THE INVENTION

The present invention relates to coating compositions for glass articles. More particularly, this invention relates to improved abrasion resistant coating compositions for glass articles.

In the United States and several other countries, glass vessels which are used for beer, soft drinks, milk and the like are generally returned after use and then reused. During bottling processes, e.g., packaging and transportation, such bottles undergo considerable abrasion damage, such as grazing, scratching, galling, scoring, and similar abrasive action (hereinafter referred to collectively as "scuffing") whereby scuff marks are left on the surfaces of the glass bottles. Scuffing phenomena is aggravated by mechanical grinding due to bottle-to-bottle pressure, mould lines, guide rails, and caustic etching and leaching. Scuff marks lead to bottle fatigue which makes bottles more susceptible to breakage. In addition, scuffing markedly impairs the appearance of the glass bottles and reduces the commodity value of the resulting bottled beverages.

Efforts have been made to provide coating compositions for concealing scuff marks on bottle surfaces.

Copending, commonly assigned U.S. patent application Ser. No. 07/564,927 (Pawar et al.), filed Aug. 8, 1990, discloses an improved coating composition for glass articles, wherein the composition contains from about 70% to about 100% of (A) a composition containing by weight (1) from about 50% to about 75% of an organooxy-chainstopped organopolysilsequioxane containing $RSiO_{3/2}$ units and $R(R^1O)_{3-2n}SiO_n$ units, (2) from about 5 to about 15 percent of tetraorganotitanate, (3) from 10 to about 20 percent of an organotriorganooxysilane, and (4) from 0 to about percent of a carboxylic acid ester, and (B) from 0 to about 30 percent of a volatile diluent.

U.S. Pat. No. 4,985,286 (Kurita et al.) discloses an abrasion-concealing agent for glass containers, comprising (A) a polyorganosiloxane and (B) a volatile polydimethylsiloxane. The composition also contains a curing catalyst which can be tetrabutyltitanate.

U.S. Pat. No. 4,273,834 (Yokokura et al.) discloses a scuff-masking composition for glass vessels, wherein the composition contains an organopolysiloxane terminated with a phenyl group, a methyl group, and an alkoxy group, and a curing catalyst, e.g., tetrabutyltitanate. The ratio of the phenyl, methyl and alkoxy groups to one another is critical to the scuff-masking properties of the coating in Yokokura et al.

Japanese Patent Application Sho 63-117932 discloses a glass bottle scratch concealing agent which consists of (A) an aqueous waxy substance emulsion and (B) a polyorganosiloxane. The composition may further contain a curing catalyst such as tetrabutyltitanate.

Other compositions for concealing graze marks on glass bottles are disclosed, for example, in U.S. Pat. Nos. 4,656,221 (Kurita et al.) and 4,467,068 (Maruyama et al.).

It is desirable to provide a coating composition for glass articles wherein the coating has improved abrasion resistance to scuffing phenomena.

The present invention is based on the discovery that a coating composition containing certain crosslinkers and/or certain base copolymers will have improved abrasion resistance to scuffing phenomena.

The use of methyltrialkoxysilanes and phenyltrialkoxysilanes as crosslinkers is known in the art. The phenyltrialkoxysilanes provide better abrasion resistance than the methyltrialkoxysilanes but the phenyltrialkoxysilanes are disadvantageous in that their production results in the formation of PCBs and benzene as by-products, which is undesirable because these by-products appear to have a deleterious effect on the environment.

It is desirable therefore to provide an alternative crosslinker to the phenyltrialkoxysilanes as well as to the methyltrialkoxysilanes, wherein the alternative crosslinker is at least equivalent to the phenyltrialkoxysilanes in providing good abrasion resistance to scuffing phenomena but which is not as potentially harmful to the environment. It is further desirable to provide a crosslinker which provides superior abrasion resistance than the methyltrialkoxysilanes.

Such crosslinkers are provided in the present invention.

SUMMARY OF THE INVENTION

The present invention provides a curable coating composition having improved abrasion resistance and comprising by weight:

(A) from about 15% to about 100% of a composition comprising by weight:
   (1) from about 50% to about 95% of an organooxy-chainstopped organopolysilsesquioxane having a viscosity of from about 5 to about 1000 centipoises at 25° C. and consisting essentially of $RSiO_{3/2}$ units and $R(R^1O)_{3-2a}SiO_a$ units, wherein a is a number equal to 0, ½, or 1, wherein R and $R^1$ are each independently a monovalent hydrocarbon radical containing from 1 to about 20 carbon atoms, the ratio of $RSiO_{3/2}$ units to $R(R^1O)_{3-2a}SiO_a$ units being from about 1:1 to about 50:1;
   (2) from about 0.4% to about 2% of a tetraorganotitanate having the general formula $Ti(OR^2)_4$ wherein $R^2$ is a monovalent hydrocarbon radical containing from about 1 to about 10 carbon atoms;
   (3) from about 4% to about 25% of:
      (a) a siloxane-functionalized ester having the general formula

      $(R^3O)_{3-2n}SiO_nR^4OC(O)R^5C(O)OR^6$ wherein n is equal to 0, ½, or 1, each $R^3$ is independently a saturated or unsaturated monovalent hydrocarbon radical containing from 1 to about 20 carbon atoms, $R^4$ is a divalent hydrocarbon radical containing from 1 to about 20 carbon atoms, $R^5$ is a divalent conjugated olefinic radical having from 2 to 4 carbon atoms, and $R^6$ is $R^3$ or $-R^4SiO_n(OR^3)_{3-2n}$; or
      (b) a cyanoorganotrioganooxysilane having the general formula $NCR^7Si(OR^8)_3$, wherein $R^7$ is a divalent hydrocarbon radical having from 1 to about 20 carbon atoms and $R^8$ is a monovalent hydrocarbon radical having from 1 to about 20 carbon atoms, and
   (4) from about 0% to about 15% of a plasticizer; and
(B) from 0% to about 85% of a volatile diluent.

Another aspect of the present invention is directed to a coating composition having improved abrasion resistance wherein part (A) is a copolymer of the organopolysilsesquioxane (A)(1) and the ester (A)(3), described above.

The present invention is further directed to glass articles, particularly glass bottles, coated with the compositions of this invention.

DETAILED DESCRIPTION OF THE INVENTION

Figure 1:
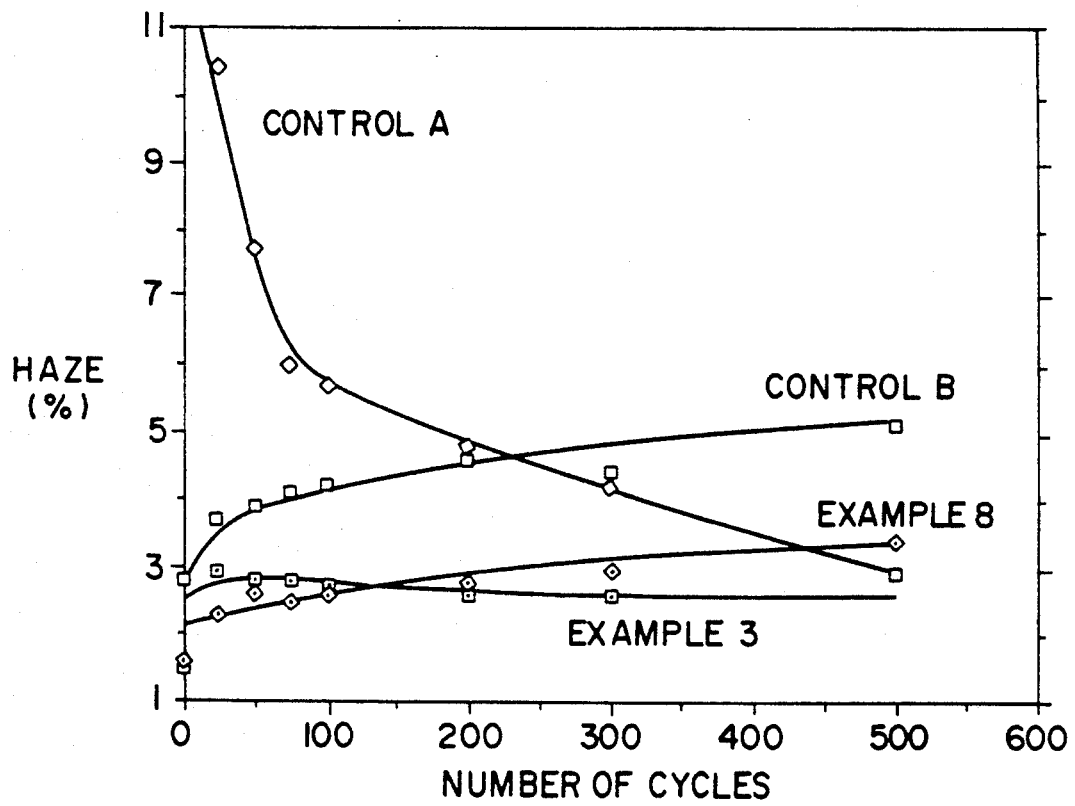
FIG. 1 is a graph depicting the results of a Taber abrasion test by plotting the % haze of four bottle coatings cured for 1 day against the number of cycles of a 250 gram weight rubber wheel to which the coatings have been subjected.

Part (A) of the composition of this invention is a composition containing (A)(1) an organooxy-chainstopped organopolysilsesquioxane, (A)(2) a tetraorganotitanate, (A)(3) (a) a siloxane-functionalized ester or (b) a cyanoorganotriorganooxysilane, and optionally, (A)(4) an organic carboxylic acid ester.

(A) is present in an amount ranging from about 15% to about 100%, preferably from about 17% to about 30%, and most preferably from about 21% to about 27%, by weight based on the combined weight of (A) and (B).

Part (A)(1) is an organooxy-chainstopped polyorganosilsequioxane having a viscosity of from about 5 to about 1000, preferably from about 5 to about 500, and most preferably from about 10 to about 200, centipoise at 25° C. The polyorganosilsequioxane consists essentially of $RSiO_{3/2}$ units and $R(R^1O)_{3-2a}SiO_a$ units, wherein a is a number equal to 0, ½, or 1 and R and $R^1$ are independently monovalent hydrocarbon radicals containing from 1 to about 20 carbon atoms, preferably from about 1 to about 8 carbon atoms, and most preferably are methyl radicals. The ratio of $RSiO_{3/2}$ units to $R(R^1O)_{3-2a}SiO_a$ units is from about 1:1 to about 50:1, preferably from about 3:1 to about 20:1, and most preferably from about 4:1 to about 8:1.

Examples of radicals represented by R and $R^1$ in the organopolysilsesquioxane (A)(1) include alkyl groups such as methyl, ethyl, and isopropyl; cycloaliphatic radicals, such as cyclopentyl and cyclohexyl, olefinic radicals, such as vinyl and allyl, and aryl radicals, e.g., phenyl. Preferably, R and $R^1$ are both methyl radicals.

Part (A)(1) is present in an amount within the range of from about 50% to about 95%, preferably from about 55% to about 80%, and most preferably from about 65% to about 75% by weight based on the total weight of (A).

Part (A)(1) can be prepared by the low acid partial hydrolysis of an organotriorganooxysilane in the presence of an aqueous solution of an aliphatic alcohol. A catalyst, e.g., HCl, is introduced at a controlled low level as organotrichlorosilane. This minimizes the HCl/methanol side reaction which produces water, altering the critical hydrolysis stoichiometry. Partial hydrolysis followed by a vacuum strip to 60°–70° C. at 20 torr in the presence of an alkaline earth metal carbonate provides a resin having a 20 to 40 weight percent methoxy content based on solids.

Examples of suitable organotriorganooxysilanes as starting materials for the (A)(1) organopolysilsesquioxane include methyltrimethoxysilane, methyltriethoxysilane, methyltripropoxysilane, methyltributoxysilane, and the like. Methyltrimethoxysilane is preferred.

Examples of suitable aliphatic alcohols include methanol, ethanol, propanol, and the like. Methanol is preferred.

Examples of suitable organotrichlorosilanes include methyltrichlorosilanes, ethyltrichlorosilanes, and the like. Methyltrichlorosilanes are preferred.

Part (A)(2) is a tetraorganotitanate having the general formula $$Ti(OR^2)_4 \quad (I)$$

wherein $R^2$ is a monovalent hydrocarbon radical containing from about 1 to about 10 carbon atoms and preferably from about 2 to about 8 carbon atoms. Most preferably, $R^2$ is a butyl radical, i.e., (A)(2) is most preferably tetrabutyltitanate.

Part (A)(2) functions as a curing catalyst to crosslink the organopolysilsesquioxane (A)(1).

Tetraorganotitanates are used as the curing catalyst in the present invention because they provide faster cure times than other known curing catalysts. The abrasion resistance of the cured product is adversely affected by long cure times.

Part (A)(2) is present in an amount within the range of from about 0.4% to about 2%, preferably from about 0.6% to about 1.8%, and most preferably from about 0.8% to about 1.7% by weight based on the total weight of (A). If the amount of (A)(2) is less than about 0.4% by weight based on the total weight of (A), the cure and drying times of the coating are too slow for practical use. On the other hand, the use of (A)(2) in an amount exceeding about 2% by weight based on the total weight of (A) may impair the shelf-life of the formulation.

Part (A)(3)(a) is a siloxane-functionalized ester having the general formula $$(R^3O)_{3-2n}SiO_nR^4OC(O)R^5C(O)OR^6 \quad (II)$$

wherein n is equal to 0, ½, or 1, each $R^3$ is independently a saturated or unsaturated monovalent hydrocarbon radical containing from 1 to about 20 carbon atoms, $R^4$ is a divalent hydrocarbon radical containing from 1 to about 20 carbon atoms, $R^5$ is a divalent conjugated olefinic radical having from 2 to 4 carbon atoms, and $R^6$ is $R^3$ or $-R^4SiO_n(OR^3)_{3-2n}$.

In formula (II) above, n is preferably 0. $R^3$ is preferably an alkyl group having from 1 to about 8 carbon atoms and most preferably is a methyl group. $R^4$ is preferably a saturated alkylene group having from 1 to about 8 carbon atoms and most preferably is a propylene group. $R^5$ is preferably an ethylene radical and $R^6$ is preferably $-R^4SiO_n(OR^3)_{3-2n}$ and most preferably a radical having the formula $-(CH_2)_3SiO_n(OCH_3)_{3-2n}$.

In the ester of formula (II), the two ester groups may be in the cis (i.e., maleate) or in the trans position (i.e., fumarate) with regard to one another. (A)(3) may contain mixtures of the maleate and fumarate esters.

The preferred compounds within the scope of formula (I) are bis[3-(trimethoxysilyl)alkyl]maleates and bis[3-(trimethoxysilyl)alkyl]fumarates, with bis[3-(trimethoxysilyl)alkyl]maleates being most preferred.

Compounds of formula (II) and methods for preparing them are disclosed in U.S. Pat. Nos. 3,759,968 (Berger et al.); 3,941,741 (De Zuba et al.); 4,308,372 (Smith, Jr. et al.); and 4,256,870 (Eckberg); all of which are incorporated by reference herein.

The compounds of formula (II) can prepared, for example, by reacting compounds of the formulas

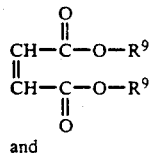 (III)

and

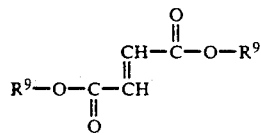 (IV)

wherein $R^9$ is selected from unsaturated monovalent hydrocarbon radicals and unsaturated halogenated monovalent hydrocarbon radicals with a hydrosilane of the formula

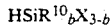 (V)

in the presence of a platinum catalyst, wherein $R^{10}$ is selected from monovalent hydrocarbon radicals and halogenated monovalent hydrocarbon radicals, X is a halogen or an alkoxy radical and preferably chlorine, and "b" is a whole number that varies from 0 to 3.

The reaction is preferably carried out at room temperature and a solvent is not required, although, any inert solvent such as toluene, xylene, mineral spirits, benzene, and the like can be used. Suitable catalysts for the addition of the silane of formula (V) to the compounds of formulas (III) and (IV) are the various platinum and platinum compound catalysts known in the art. These catalysts include elemental platinum in the finely divided state which can be deposited on charcoal or aluminum, as well as the various platinum compounds such as chloroplatinic acid, a platinum hydrocarbon complex of the type shown in U.S. Pat. Nos. 3,159,601; 3,159,602; as well as the platinum alcoholic complexes prepared from the chloroplatinic acids which are described in U.S. Pat. No. 3,220,972 (Lamoreaux).

To replace the chlorine atoms, the halosilyl ester or imide may be reacted with an alcohol of the formula $R^{11}OH$ or an acid of the formula $R^{11}COOH$, wherein $R^{11}$ is selected from monovalent hydrocarbon radicals and halogenated monovalent hydrocarbon radicals and is preferably a saturated monovalent hydrocarbon, such as alkyl, with no more than 8 carbon atoms. In preparing the reaction mixture, one mole of the halosilylmaleate is reacted with an excess of the alcohol or acid such that the number of moles of alcohol or acid exceeds the number of moles of the halogen attached to the silicon atom, and the reaction is allowed to proceed at reduced pressures and moderate temperatures when it is carried out in the absence of a solvent. The reduced pressures and moderate temperatures are preferred so that the acid that is formed from the alkoxylation or acylation would be boiled off and will not contaminate the desired product. Thus, it is preferred that the reaction be carried out at less than 100 mm of mercury pressure at temperatures in the range of 75° C. to 100° C.

As an alternative, the alkoxylation or acylation reaction may be carried out in the presence of a hydrocarbon solvent, in which solvent the hydrogen chloride that was released is not soluble so that during the course of the reaction, the acid which is given off does not affect the silylmaleate or silylfumarate product which is within the scope of formulas (III) and (IV). As an alternative, both the maleates and fumarates of formulas (III) and (IV) may be reacted with a hydroalkoxysilane in place of the hydrohalosilane of formula (V). However, with the alkoxysilane, the SiH-olefin addition in the presence of a platinum catalyst proceeds more slowly than in the case where the silane of formula (V) is used.

Part (A)(3)(b) is a cyanoorganotriorganooxysilane having the general formula $NCR^7Si(OR^8)_3$, wherein $R^7$ is a divalent hydrocarbon radical having from 1 to about 20 carbon atoms and $R^8$ is a monovalent hydrocarbon radical having from 1 to about 20 carbon atoms. $R^7$ is preferably an alkylene group having from 1 to about 8 carbon atoms and most preferably is methylene. $R^8$ is preferably an alkyl radical having from 1 to about 8 carbon atoms and most preferably is methyl.

It is to be understood by those skilled in the art that cyanoorganotriorganooxysilanes readily undergo hydrolysis in the presence of water and should therefore be stored under anhydrous conditions.

Cyanoorganotriorganooxysilanes (A)(3)(b) are commercially available.

Part (A)(3) is present in the composition of this invention in an amount ranging from about 4% to about 25%, preferably from about 5% to about 23%, and most preferably from about 7% to about 20%, by weight based on the total weight of (A).

Part (A)(4) is a plasticizer. Organic carboxylic acid esters having from about 6 to about 22 carbon atoms are preferred. They can be either aliphatic or aromatic and can contain either one or more ester groups. Examples of suitable carboxylic acid esters include ethyl laurate, isopropyl myristate, isopropyl palmitate, isopropyl behenate, decyl acetate, behenyl butyrate, hexadecyl acetate, decyl decanoate, methyl oleate, lauryl laurate, oleyl acetate, dioctyladipate, dioctyl sebacate, dibutyl phthalate, diheptyl phthalate, di(2-ethylhexyl)phthalate, butylbenzyl phthalate, butylphthalyl glycolate.

Other suitable plasticizers for use in this invention include, for example, esters of polyalkylene glycol such as diethylene glycol dibenzoate and triethylene glycol dibenzoate; phosphoric acid esters such as tricresyl phosphate or tributyl phosphate; chlorinated paraffins; hydrocarbon oils such as an alkyl diphenyl or a partially hydrogenated terphenyl; and the like.

Preferred plasticizers for use in this invention are isopropyl myristate and dioctyladipate, with isopropyl myristate being most preferred.

The plasticizer is used alone or as an admixture with one or more other plasticizers.

The plasticizer also functions herein to provide a lubricating surface on the glass article coated wth the composition of this invention, the lubricating function further improving the glass surface's resistance to scuffing.

Part (A)(4) is present in the composition of this invention in an amount within the range of from 0 to about 15, preferably from about 5 to about 15, and most preferably from about 8 to about 12, percent by weight, based on the total weight of (A).

Part (B) of the composition of this invention is a volatile diluent. It can be a volatile silicone or organic fluid. As used herein, "volatile" refers to those materials which have a measureable vapor pressure at ambient conditions.

Suitable volatile silicone fluids may be cyclic or linear. A description of various volatile silicone oils is found in Todd et al., "Volatile Silicone Fluids for Cosmetics", 91 Cosmetics and Toiletries, 27-32 (1976), hereby incorporated by reference herein. Linear volatile silicones generally have viscosities of less than about five centistokes at 25° C., whereas the cyclic silicones have viscosities of less than about 10 centistokes.

In general, the volatile silicone fluid can be any combination of tetramer, pentamer, and hexamer, or a low viscosity diorgano fluid. Generally, suitable cyclic volatile silicone fluids can be represented by the formula:

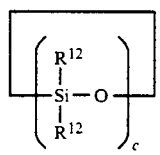

wherein $R^{12}$ is an alkyl group having from 1 to about 3 carbon atoms and "c" is a number from 3 to about 10 and preferably from 3 to 7.

The preferred volatile silicone fluids for use in this invention are cyclics such as cyclomethicone pentamer and the cyclomethicone tetramer, and linears such as phenethylpentamethyldisiloxane. The most preferred volatile silicone fluid is cyclomethicone pentamer because of its availability. However, for purposes of improving the clarity of the curable compositions, the linear volatile silicone fluids such as phenethylpentamethyldisiloxane are preferred.

Examples of suitable volatile organic fluids are linear or branched isoparaffinic hydrocarbons having from about 6 to about 16 carbon atoms and preferably about 10 to about 14 carbon atoms. The most preferred isoparaffinic hydrocarbons are those available from Exxon Corporation and having the designation ISOPAR ®.

The volatile diluent (B) is present in the composition of this invention in an amount within the range of from about 0% to about 85%, preferably from about 70% to about 83%, and most preferably from about 73% to about 79% by weight based on the combined weight of (A) and (B).

The composition of this invention containing (A) and (B) can be prepared by mixing the organopolysilsesquioxane (A)(1) and the crosslinking agent (A)(3) and then adding the plasticizer (A)(4) to the mixture. The ingredients are blended until uniform. The catalyst (A)(2) is then added to the mixture.

In an alternative embodiment of the present invention, there is provided a curable composition having improved abrasion resistance and comprising by weight:

(I) from about 15% to about 100% of a composition comprising by weight:
(1) from about 85% to about 99.6% of a copolymer comprising by weight:

(a) from about 5% to about 30% of monovalent siloxane-functionalized ester units of the formula

wherein "d" is equal to 0, ½, 1, or 1½, each $R^3$ is independently a saturated or unsaturated monovalent hydrocarbon radical containing from 1 to about 20 carbon atoms, $R^4$ is a divalent hydrocarbon radical containing from 1 to about 20 carbon atoms, $R^5$ is a divalent conjugated olefinic radical having from 2 to 4 carbon atoms, and $R^6$ is $R^3$ or $-R^4SiO_d(OR^3)_{2-2d}$, and (b) from about 70% to about 95% of radicals derived from an organooxy-chainstopped organopolysilsesquioxane having a viscosity of from about 5 to about 1000 centipoises at 25° C. and consisting essentially of $RSiO_{3/2}$ units and $R(R^1O)_{3-2n}SiO_n$ units, wherein "n" is a number equal to 0, ½, or 1, wherein R and $R^1$ are independently a monovalent hydrocarbon radical containing from 1 to about 20 carbon atoms, the ratio of $RSiO_{3/2}$ units to $R(R^1O)_{3-2n}SiO_n$ units being from about 1:1 to about 50:1;

(2) from about 0.4% to about 2% of a tetraorganotitanate having the general formula $Ti(OR^2)_4$ wherein $R^2$ is a monovalent hydrocarbon radical containing from about 1 to about 10 carbon atoms; and (3) from about 0% to about 15% of a plasticizer; and (II) from 0% to about 85% of a volatile diluent.

In the copolymer (I)(1), R, $R^1$, $R^3$, $R^4$, $R^5$, and n are as previously defined herein, with the same preferences. The letter "a" represents a number equal to 0, ½ or 1, and preferably 0.

(I) is preferably present in the composition in an amount within the range of from about 17% to about 30% and most preferably from about 21% to about 27%. (II) is preferably present in the composition in an amount within the range of from about 70% to about 83% and most preferably from about 73% to about 79%.

(I)(1) is preferably present in the composition in an amount within the range of from about 86% to about 95% and most preferably from about 87% to about 89%.

The units of (I)(1)(a) are present in an amount within the range of from about 5% to about 30%, preferably from about 15% to about 25%, and most preferably about 20% by weight based on the total weight of the copolymer (I)(1). The units of (I)(1)(b) are present in an amount within the range of from about 70% to about 95%, preferably from about 75% to about 85%, and most preferably about 80% by weight based on the total weight of the copolymer (I)(1).

Copolymer (I)(1) is present in the composition in an amount of from about 85% to about 99.6%, preferably from about 86% to about 95%, and most preferably from about 87% to about 89%, by weight based on the combined weight of composition (I) and volatile diluent (II).

Copolymer (I)(1) can be prepared by mixing appropriate amounts of an alkyltrialkoxysilane, an organic alcohol, and a maleate ester or a fumarate ester and agitating the mixture for 10 to about 30 minutes at room temperature. A water solution of an acid, e.g., HCl, is then added slowly to the reaction mixture for a period of about 30 to about 60 minutes, the ensuing exotherm bringing the reactants to reflux. The reaction mixture is refluxed for about 1 to about 3 hours and then neutralized. The alcohol and other volatiles are then stripped off under a vacuum of less than or equal to 50 mmHg at a temperature of from about 95° C. to about 135° C. and the resulting product is isolated by filtration.

Components (I)(2), (I)(3), and (II) are the same as components (A)(2), (A)(4), and volatile diluent (B), respectively, described previously herein in connection with the first composition of the present invention. The amounts of the catalyst (I)(2), plasticizer (I)(3) and volatile diluent (II) are also the same as described previously herein in connection with the catalyst, plasticizer, and volatile diluent used in the first composition of this invention, with the same preferences.

The composition containing the copolymer (I) and the volatile diluent (II) can be prepared by adding the plasticizer (I)(3) to the mixture, blending the ingredients until uniform, and then adding the catalyst (2) to the mixture.

The curable compositions of this invention are applied to the surface of a bottle or other glass article by brush-coating, puff-coating, dip-coating, and the like, and the bottle is allowed to stand at room temperature until curing is complete. The thickness of the coating can be varied according to the degree of thickness needed to effectively conceal the scuff marks. Typically, the thickness of the coat is within the range of from about 1.0 to about 4.0 microns.

In order that those skilled in the art will be better able to practice the present invention, the following examples are given by way of illustration and not by way of limitation. All parts and precentages are by weight, unless otherwise noted.

EXPERIMENTAL

The following terms used in the examples, tables and figures below are defined as follows:

"Methyl T Resin"—refers to a silicon compound containing greater than 99.0% by weight of methyltrimethoxysilane with the remaining contents being dimethyltetramethoxydisiloxane.

"Pentamer"—refers to decamethylcyclopentasiloxane.

"Resin/Maleate Copolymer"—a copolymer of bis-(trimethoxysilylpropyl)maleate and methyl T resin prepared according to the method described in Example 7 below.

"Control A"—refers to the composition prepared in Comparative Example A.

"Control B"—refers to the composition prepared in Comparative Example B.

"Haze"—a measurement of scattered light.

"% Haze"—the percentage of light that is scattered relative to the source. Percentages above 4%–5% indicate observable haze.

Comparative Examples A and B and Examples 1–4

Six compositions were prepared having the formulations shown in Table 1 below. All percentages are by weight.

TABLE 1

| | Comparative Examples A and B and Examples 1–4: Formulations | | | | | |
|---|---|---|---|---|---|---|
| | Example No | | | | | |
| Ingredients | A | B | 1 | 2 | 3 | 4 |
| Methyl T Resin | 16.5% | 16.5% | 16.5% | 16.5% | 16.5% | 16.5% |
| Phenyl trimethoxysilane | 4.5% | 0% | 0% | 0% | 0% | 0% |
| Methyl triethoxysilane | 0% | 4.5% | 0% | 0% | 0% | 0% |
| B-cyanoethyltrimethoxysilane | 0% | 0% | 4.5% | 4.5% | 0% | 0% |
| Bis(trimethoxysilylpropyl)maleate | 0% | 0% | 0% | 0% | 4.5% | 4.5% |
| Isopropylmyristate | 2.5% | 0% | 2.5% | 0% | 2.5% | 0% |
| Dioctylphthalate | 0% | 2.5% | 0% | 2.5% | 0% | 2.5% |
| Tetrabutyltitanate | 0.2% | 0.2% | 0.2% | 0.2% | 0.2% | 0.2% |
| Pentamer | 76.3% | 76.3% | 76.3% | 76.3% | 76.3% | 76.3% |

The compositions prepared in Comparative Examples A and B and Examples 1–4 were coated on a number of glass bottles and tested for abrasion resistance by means of a vibration test carried out at 165 cycles per minute for 60 minutes on a standard partition and a clay-coated partition in a vibration testing machine. The abrasion resistance of each composition was measured at 15 minute intervals during the vibration testing period. The level of abrasion resistance was determined by visual observation which focused on three features indicative of abrasion resistance: (1) whiteness of the coating, (2) dirt pickup, and (3) erosion of the coating. The results of the vibration tests using the standard partition are shown in Table 2 and the results using the clay-coated partition are shown in Table 3. In Tables 2 and 3, the term "pass" means that 65% or more of the bottles tested containing the particular coating in question exhibited acceptably low whiteness, low dirt pickup and low erosion of the coating, while the term "fail" means that 35% or below exhibited such properties. The term "marginal" means that about 50% of the bottles tested containing the particular coating in question passed while approximately 50% failed.

TABLE 2

| Comparative Examples A & B and Examples 1–4: Abrasion Resistance (Standard Partition) | | | | |
|---|---|---|---|---|
| | Abrasion Resistance | | | |
| Example No. | After 15 minutes | After 30 minutes | After 45 minutes | After 60 minutes |
| A | pass | pass | pass | pass |
| B | fail | fail | fail | fail |
| 1 | pass | pass | pass | pass |
| 2 | pass | fail | fail | fail |
| 3 | pass | pass | pass | pass |
| 4 | pass | pass | pass | pass |

TABLE 3

| Comparative Examples A & B and Examples 1–4: Abrasion Resistance (Clay-coated Partitions) | | | | |
|---|---|---|---|---|
| | Abrasion Resistance | | | |
| Example No. | After 15 minutes | After 30 minutes | After 45 minutes | After 60 minutes |
| A | pass | pass | pass | pass |

TABLE 3-continued

Comparative Examples A & B and
Examples 1-4: Abrasion Resistance (Clay-coated Partitions)

| Example No. | Abrasion Resistance | | | |
|---|---|---|---|---|
| | After 15 minutes | After 30 minutes | After 45 minutes | After 60 minutes |
| B | marginal | fail | fail | fail |
| 1 | pass | pass | pass | pass |
| 2 | fail | fail | fail | fail |
| 3 | pass | pass | pass | pass |
| 4 | marginal | marginal | marginal | marginal |

The abrasion resistance results shown in Tables 2 and 3 above indicate that the beta-cyanoethyltrimethoxysilane and bis(trimethoxysilylpropyl)maleate crosslinkers performed as well as phenyltriethoxysilane, the crosslinker used in Comparative Example A, and were superior to methyltriethoxysilanes, the crosslinker used in Comparison Example B. The cure rates of the compositions prepared in Comparative Examples A and B and Examples 1-4 all ranged between 24 and 48 hours.

Examples 5 and 6

Examples 5 and 6 compare the effect on clarity of pentamer and phenethylpentamethyldisiloxane. The composition prepared in Example 3 above was hazy. In Examples 5 and 6, two compositions were prepared which were identical to that prepared in Example 3 above, except that in the composition of Example 5, 38.3% by weight of pentamer and 38.0% by weight of phenethylpentamethyldisiloxane was used in place of the 76.3% by weight of pentamer, and in Example 6, 76.3% by weight of phenethylpentamethyldisiloxane was used in place of pentamer.

The compositions prepared in Examples 5 and 6 were both clear. The cure rates of these 2 compositions were also in the range of 24-48 hours.

Example 7

Example 7 illustrates the preparation of a copolymer of bis(trimethoxysilylpropyl)maleate and methyl T resin. In a reaction flask equipped for vacuum distillation were placed 73.67 parts of methyltrimethoxysilane, 9.33 parts of methanol, and 9.13 parts of maleate ester. The reactant were stirred for 30 minutes at ambient temperature. To 7.87 parts of ice cold water were added 140 parts per million (ppm) of 37% HCl (aqueous). The acidic water was then added slowly to the methanolic solution over 30 minutes. The ensuing exotherm brought the reactants to reflux. The solution was then refluxed for 2 hours and then neutralized with NaHCO$_3$. The methanol and other low molecular weight volatiles were then stripped off under 30 mmHg vacuum to about 135° C. The product was then filtered through a celite pad.

Example 8

The following composition was prepared in Example 8:

| Ingredient | Amount (% by weight) |
|---|---|
| Resin/Maleate Copolymer | 21.0 |
| Isopropyl Myristate | 2.5 |
| Tetrabutyltitanate | 0.2 |
| Pentamer | 76.3 |

The abrasion resistance properties of the compositions prepared in Comparative Examples A and B and Examples 3 and 8 were measured as follows. Coatings of the compositions were cast on to glass plates having dimensions of 4"×4"×⅛". Each coating was subjected to a Taber abrasion test using CS-0 rubber wheels with a 250 gram weight.

In FIG. 1, the haze versus the number of cycles is plotted for coatings which had been cured for 1 day. The % haze for the coating of Control A was lower because the coating was not fully cured. The % haze for the coating of Control B increased slowly over the cycle range, indicating a decrease in abrasion resistance. In addition, the % haze of the coating prepared in Example 3 was in the 4%-5% range, meaning that the haze was visible. The % haze for the coatings prepared in Examples 3 and 8 flattened out, indicating no decrease in abrasion resistance.

Figure 2:
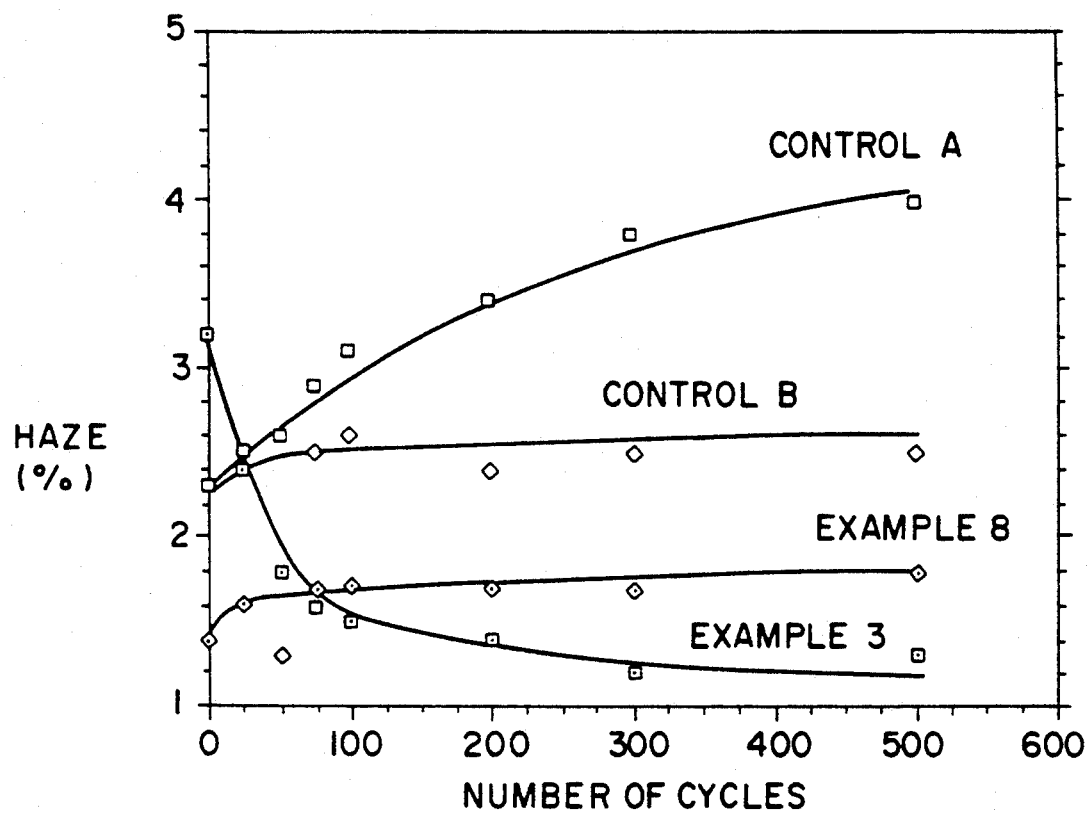
FIG. 2 is a graph depicting the results of a Taber abrasion test by plotting the % haze of four bottle coatings cured for 3 days against the number of cycles of a 250 gram weight rubber wheel to which the coatings have been subjected.

In FIG. 2, the haze versus the number of cycles is plotted for coatings which had been cured for 3 days. The % haze for the coating of Control A increased over the cycle range, indicating a decrease in abrasion resistance. The % haze for the coatings of Control B, Examples 3 and 8 flattened out, indicating no decrease in abrasion resistance.

Figure 3:
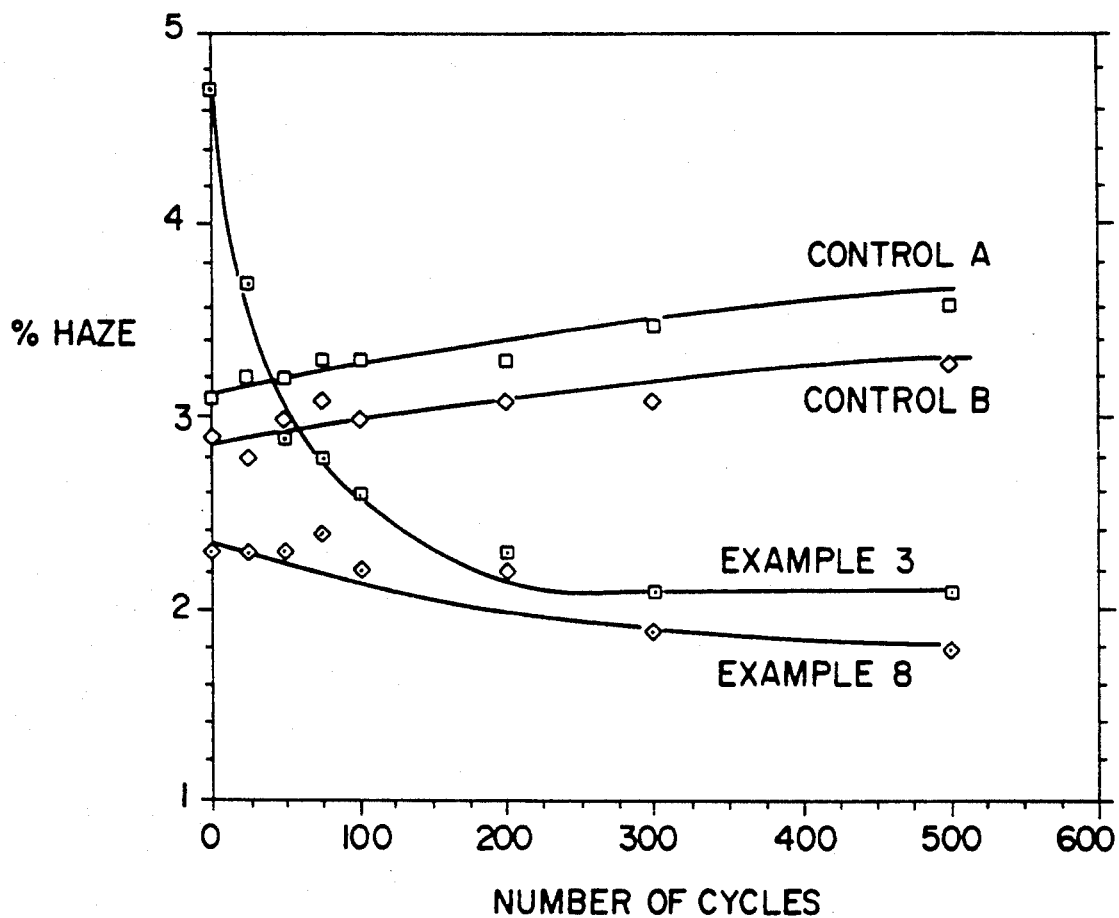
FIG. 3 is a graph depicting the results of a Taber abrasion test by plotting the % haze of four bottle coatings cured for 7 days against the number of cycles of a 250 gram weight rubber wheel to which the coatings have been subjected.

In FIG. 3, the haze versus the number of cycles is plotted for coatings which had been cured for 7 days. The % haze for the coatings of Control A and Control B and Examples 3 and 8 were approximately the same. The coatings of Control A and B were fully cured by this time. All coatings had good abrasion resistance.

What is claimed is:

1. A curable coating composition having improved abrasion resistance, comprising by weight:
   (A) from about 15% to about 100% of a composition comprising by weight:
     (1) from about 50% to about 95% of an organooxychainstopped organopolysilsesquioxane having a viscosity of from about 5 to about 1000 centipoises at 25° C. and consisting essentially of RSiO$_{3/2}$ units and R(R$^1$O)$_{3-2a}$SiO$_a$ units, wherein a is a number equal to 0, ½, or 1, wherein R and R$^1$ are each independently a monovalent hydrocarbon radical containing from 1 to about 20 carbon atoms, the ratio of RSiO$_{3/2}$ units to R(R$^1$O)$_{3-2a}$SiO$_a$ units being from about 1:1 to about 50:1;
     (2) from about 0.4% to about 2% of a tetraorganotitanate having the general formula Ti(OR$^2$)$_4$ wherein R$^2$ is a monovalent hydrocarbon radical containing from about 1 to about 10 carbon atoms;
     (3) from about 4% to about 25% of:
       (a) a siloxane-functionalized ester having the general formula

       (R$^3$O)$_{3-2n}$SiO$_n$R$^4$OC(O)R$^5$C(O)OR$^6$ wherein n is equal to 0, ½, or 1, each R$^3$ is independently a saturated or unsaturated monovalent hydrocarbon radical containing from 1 to about 20 carbon atoms, R$^4$ is a divalent hydrocarbon radical containing from 1 to about 20 carbon atoms, R$^5$ is a divalent conjugated olefinic radical having from 2 to 4 carbon atoms, and R$^6$ is R$^3$ or —R$^4$SiO$_n$(OR$^3$)$_{3-2n}$; or
       (b) a cyanoorganotriorganooxysilane having the general formula NCR$^7$Si(OR$^8$)$_3$, wherein R$^7$ is a divalent hydrocarbon radical having from 1 to about 20 carbon atoms and R$^8$ is a monovalent hydrocarbon radical having from 1 to about 20 carbon atoms, and (4) from about 0% to about 15% of a plasticizer; and (B) from 0% to about 85% of a volatile diluent.

2. A composition according to claim 1 wherein (A) is present in an amount within the range of from about 17% to about 30% and (B) is present in an amount within the range of from about 70% to about 83%.

3. A composition according to claim 2 wherein (A) is present in an amount within the range of from about 21% to about 27% and (B) is present in an amount within the range of from about 73% to about 79%.

4. A composition according to claim 1 wherein (A)(1) is present in an amount within the range of from about 55% to about 80%, (A)(2) is present in an amount within the range of from about 0.6% to about 1.8%, (A)(3) is present in an amount within the range of from about 5% to about 23%, and (A)(4) is present in an amount within the range of from about 5% to about 15%.

5. A composition according to claim 4 wherein (A)(1) is present in an amount within the range of from about 65% to about 75%, (A)(2) is present in an amount within the range of from about 0.8% to about 1.7%, (A)(3) is present in an amount within the range of from about 7% to about 20%, and (A)(4) is present in an amount within the range of from about 8% to about 12%.

6. A composition according to claim 1 wherein R and $R^1$ are each monovalent hydrocarbon radicals having from 1 to about 8 carbon atoms, $R^2$ is a monovalent hydrocarbon radical having from 2 to about 8 carbon atoms, $R^3$ is an alkyl group having from 1 to about 8 carbon atoms, $R^4$ is a saturated alkylene group having from 1 to about 8 carbon atoms, $R^5$ is an ethylene radical, $R^6$ is $-R^4SiO_n(OR^3)_{3-2n}$, $R^7$ is an alkylene group having from 1 to about 8 carbon atoms, and $R^8$ is an alkyl radical having from 1 to about 8 carbon atoms.

7. A composition according to claim 6 wherein R and $R^1$ are each methyl radicals, $R^2$ is a butyl radical, $R^3$ is a methyl radical, $R^4$ is a propylene radical, $R^6$ is $-CH_2CH_2CH_2SiO_n(OCH_3)_{3-2n}$, $R^7$ is a methylene radical, and $R^8$ is methyl.

8. A composition according to claim 1 wherein the ratio of $RSiO_{3/2}$ units to $R(R^1O)_{3-2a}SiO_a$ units is from about 3:1 to about 20:1.

9. A composition according to claim 8 wherein the ratio of $RSiO_{3/2}$ units to $R(R^1O)_{3-2a}SiO_a$ units is from about 4:1 to about 8:1.

10. A composition according to claim 1 wherein the plasticizer (A)(4) is isopropyl myristate or dioctyladipate.

11. A composition according to claim 10 wherein the plasticizer (A)(4) is isopropyl myristate.

12. A curable coating composition having improved abrasion resistance, comprising by weight:

(I) from about 15% to about 100% of a composition comprising by weight:

(1) from about 85% to about 99.6% of a copolymer comprising by weight:

(a) from about 5% to about 30% of monovalent siloxanefunctionalized ester units of the formula
$-(R^3O)_{3-2d}SiO_dR^4OC(O)R^5C(O)OR^6$
wherein "d" is equal to 0, ½, 1, or 1½, each $R^3$ is independently a saturated or unsaturated monovalent hydrocarbon radical containing from 1 to about 20 carbon atoms, $R^4$ is a divalent hydrocarbon radical containing from 1 to about 20 carbon atoms, $R^5$ is a divalent conjugated olefinic radical having from 2 to 4 carbon atoms, and $R^6$ is $R^3$ or $-R^4SiO_d(OR^3)_{2-2d}$; and (b) from about 70% to about 95% of radicals derived from an organooxy-chainstopped organopolysilsesquioxane having a viscosity of from about 5 to about 1000 centipoises at 25° C. and consisting essentially of $RSiO_{3/2}$ units and $R(R^1O)_{3-2n}SiO_n$ units, wherein "n" is a number equal to 0, ½, or 1, wherein R and $R^1$ are independently a monovalent hydrocarbon radical containing from 1 to about 20 carbon atoms, the ratio of $RSiO_{3/2}$ units to $R(R^1O)_{3-2n}SiO_n$ units being from about 1:1 to about 50:1;

(2) from about 0.4% to about 2% of a tetraorganotitanate having the general formula $Ti(OR^2)_4$ wherein $R^2$ is a monovalent hydrocarbon radical containing from about 1 to about 10 carbon atoms; and (3) from about 0% to about 15% of a plasticizer; and (II) from 0% to about 85% of a volatile diluent.

13. A composition according to claim 12 wherein (I) is present in an amount within the range of from about 17% to about 30% and (II) is present in an amount within the range of from about 70% to about 83%.

14. A composition according to claim 13 wherein (I) is present in an amount within the range of from about 21% to about 27% and (II) is present in an amount within the range of from about 73% to about 79%.

15. A composition according to claim 12 wherein (I)(1) is present in an amount within the range of from about 86% to about 95%, (I)(1)(a) is present in an amount within the range of from about 15% to about 25%, (I)(1)(b) is present in an amount within the range of from about 70% to about 95%, (I)(2) is present in an amount within the range of from about 0.6% to about 1.8%, and (I)(3) is present in an amount within the range of from about 5% to about 15%.

16. A composition according to claim 15 wherein (I)(1) is present in an amount of from about 87% to about 89%, (I)(1)(a) is present in an amount of about 20%, (I)(1)(b) is present in an amount of about 80%, (I)(2) is present in an amount within the range of from about 0.8% to about 1.7%, and (I)(3) is present in an amount within the range of from about 8% to about 12%.

17. An article comprising a glass substrate coated with the cured composition of claim 1.

18. An article comprising a glass substrate coated with the cured composition of claim 12.

* * * * *